(12) United States Patent
Choi

(10) Patent No.: US 10,139,721 B1
(45) Date of Patent: Nov. 27, 2018

(54) APPARATUS FOR SYNTHESIZING SPATIALLY SEPARATED IMAGES

(71) Applicant: Hae-Yong Choi, Seoul (KR)

(72) Inventor: Hae-Yong Choi, Seoul (KR)

( * ) Notice: Subject to any disclaimer, the term of this patent is extended or adjusted under 35 U.S.C. 154(b) by 0 days.

(21) Appl. No.: 15/866,558

(22) Filed: Jan. 10, 2018

(30) Foreign Application Priority Data

May 23, 2017 (KR) .......................... 10-2017-0063282

(51) Int. Cl.
| | | |
|---|---|---|
| *G03B 21/26* | (2006.01) | |
| *G03B 35/22* | (2006.01) | |
| *G03B 21/56* | (2006.01) | |
| *G03B 21/32* | (2006.01) | |
| *G02B 27/22* | (2018.01) | |

(52) U.S. Cl.
CPC ......... *G03B 35/22* (2013.01); *G02B 27/2221* (2013.01); *G02B 27/2235* (2013.01); *G02B 27/2278* (2013.01); *G03B 21/26* (2013.01); *G03B 21/32* (2013.01); *G03B 21/56* (2013.01)

(58) Field of Classification Search
CPC ............. G01S 7/52068; G01S 15/8993; G02B 27/2221; G02B 27/2235; G02B 27/225; G02B 27/2278; H04N 13/00; H04N 13/30; G03B 21/56; G03B 21/26; G03B 21/32
See application file for complete search history.

(56) References Cited

U.S. PATENT DOCUMENTS

| 8,279,271 | B2 | 10/2012 | Choi | |
|---|---|---|---|---|
| 2005/0264559 | A1* | 12/2005 | Vesely | ............... G02B 27/2221 |
| | | | | 345/419 |
| 2008/0297535 | A1* | 12/2008 | Reinig | ............... G02B 27/2235 |
| | | | | 345/633 |
| 2014/0340490 | A1* | 11/2014 | Duffy | ................. G02B 27/2221 |
| | | | | 348/51 |
| 2017/0139375 | A1* | 5/2017 | Chung | .................. G03H 1/0005 |
| 2017/0364028 | A1* | 12/2017 | Christmas | .......... G02B 27/0103 |
| 2018/0164597 | A1* | 6/2018 | Bell | .................... G02B 27/2278 |
| 2018/0224662 | A1* | 8/2018 | Yu | ........................... G02B 27/22 |

FOREIGN PATENT DOCUMENTS

| KR | 10-1999-0017653 A | 3/2006 |
|---|---|---|
| KR | 20-2014-0006899 Y1 | 8/2015 |

* cited by examiner

*Primary Examiner* — William C Dowling
(74) *Attorney, Agent, or Firm* — Bacon & Thomas, PLLC

(57) ABSTRACT

An apparatus for spatially separated images in which one image is separated into a short-range image and a long-range image on two or one image display, and the short-range image is disposed on the front side, the long-range image is disposed at a long distance, and a translucent mirror is provide on the front surface of the short-range image, and the short-range image and the long-range image are synthesized while spaced apart from each other by a space distance to generate an effect of viewing a realistic image by a glassless 3D effect having perspective by a distance separation effect and obtain a spatially realistic image in vertical left and front directions, front and rear directions, left and right directions, or one left or right direction, and, an apparatus for spatially separated images capable of viewing a 4 to 10 times higher-definition spatial 3D image without polarizing glasses.

9 Claims, 15 Drawing Sheets

FIG. 12A
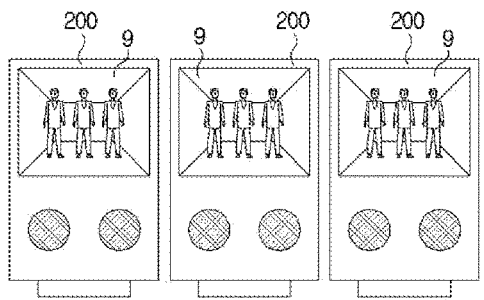
FIG. 12B
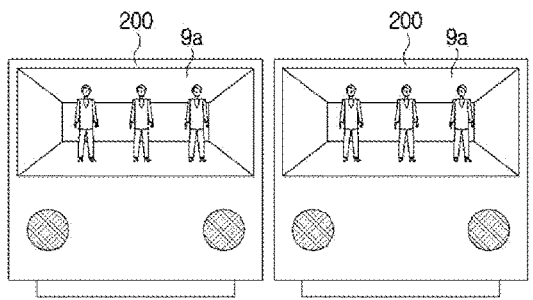
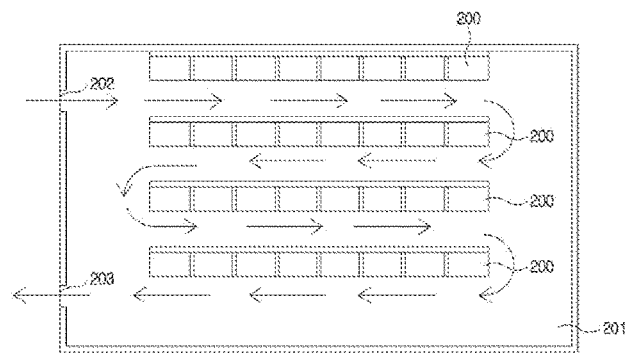
FIG. 12C

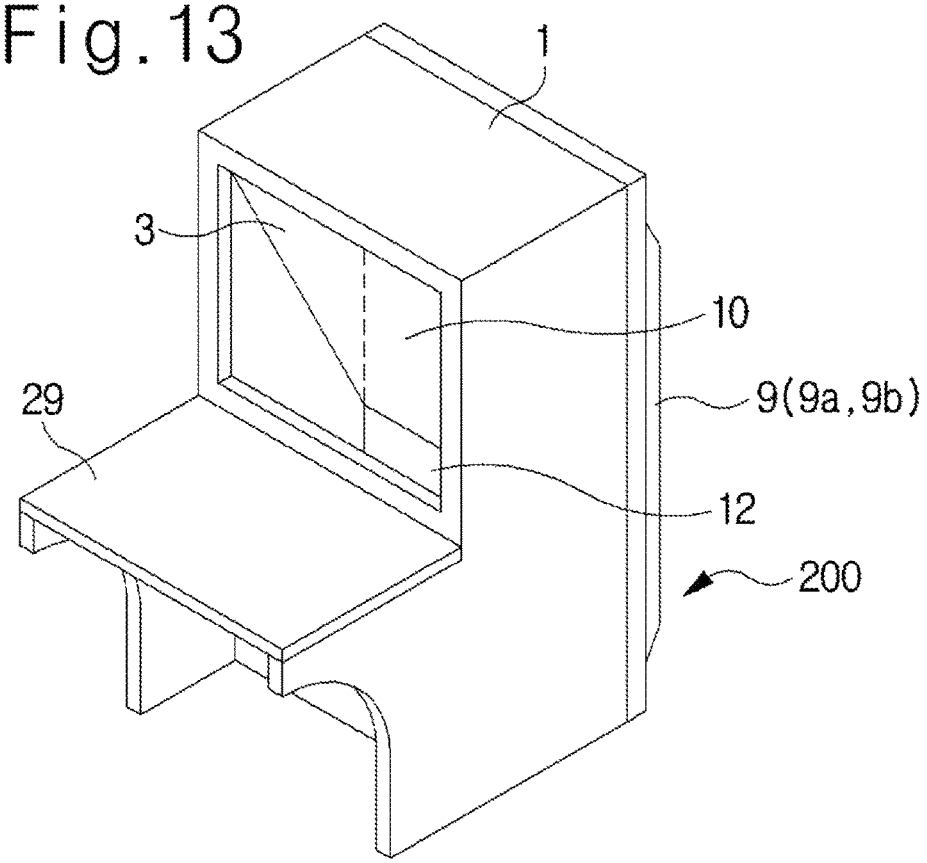

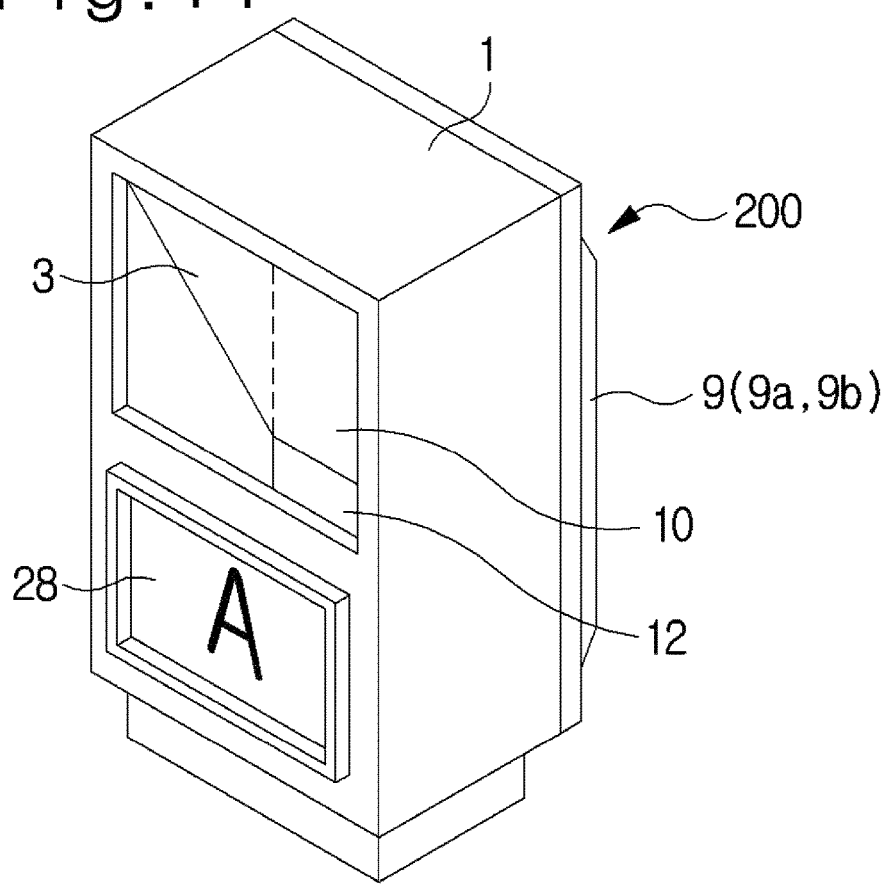

APPARATUS FOR SYNTHESIZING SPATIALLY SEPARATED IMAGES

CROSS-REFERENCE TO RELATED APPLICATION(S)

This application claims benefit of priority to Korean Patent Application No. 10-2017-0063282 filed on May 23, 2017 in the Korean Intellectual Property Office, the disclosure of which is incorporated herein by reference in its entirety.

BACKGROUND OF THE INVENTION

The present invention relates to an apparatus for converting an image into a spatially realistic image by separating one image into a short-range image and a long-range image and then separating each image position to synthesizing the separated images in a space again, and more particularly, to an apparatus for synthesizing spatially separated images capable of feeling stereoscopic realism with a high-definition image with no glasses.

A spatially separated image is a so-called a space reality effect to create a spatial three-dimensional effect by perspective by separating an image into long-range and short-range space units and different from a 3D image.

That is, a 3D spatial image is formed by perspective.

For example, in theaters performed on stage, performances by singers, games, sports games with a playground background, advertising images promoting products, and the like, a short-range image displaying motions of singers and artors one 2D screen and a long-range image displaying a stage and a background are configured by one 2D image.

Further, a conventional general 3D image separately provides a 3D left-eye image and a 3D right-eye image to cause illusion of the brain due to a difference thereof. Therefore, since the 3D image causes dizziness and is separated through polarized light, and needs to be watched with polarizing glasses again, the brightness suddenly drops to 1/10 or less to cause a blurred image and feel fatigue easily.

In addition, a method using a polarizing plate and polarized glasses can not be used for an advertising imaging apparatus targeting moving people because polarized glasses can not be carried to specific and unspecified people.

Further, a conventional translucent mirror is a translucent mirror which is not transparent by depositing an opaque material such as aluminum, and when the translucent glasses are installed in a space, the reflection surface of the opaque material remains to cause a visual obstacle.

The present invention further improves U.S. Pat. No. 8,279,271 issued by the present applicant and is improved and developed by a new method in which the brightness and the clearance are increased 4 times to 10 times and a short-range image and a long-range image are separated in a space with a glassless structure without polarized glasses and then combined in the space again.

Further, some of holographic images consisting of an existing inverted pyramid structure are just simple images in which one image is displayed in many directions and have no perspective of a short range and a long range.

Also, a conventional imaging device such as a transmissive LCD provides an image on a plane of a vertical thin film as illustrated in FIG. 1B, so that it is impossible to form a three-dimensional effect due to a so-called card board phenomenon.

Further, in Korean Patent Application No. 10-1999-0017653 and Korean Patent Application No. 20-2014-0006899, there is not disclosed a space reality method by separating a long distance image and a short distance image and combining the images together, like the present invention.

SUMMARY OF THE INVENTION

An object of the present invention is to provide a method of obtaining a space sense by natural perspective and perspective reality and a method of realizing a high definition image in a glassless mode.

According to an aspect of the present invention, provided an apparatus for spatially separated images, in which one image input by the apparatus for spatially separated images is separated into a short-range image and a long-range image, respectively, the periphery of the short-range image is configured to a low-contrast dark background so that the long-range image may be transmitted through the back side of the short-range image, first and second image displays displaying the short-range image and the long-range image are provided, respectively, a position of the second image display forms an image separation distance from the first image display, and a translucent mirror having a square transparent structure is constituted on the front surface of the short-range image.

Functions of the short-range image formed with the dark background, the long-range image, the separation distance, the square spaces, and the translucent mirror having the transparent structure organically act at the same time to implement a spatial 3D effect by perspective.

As another method, one image display displaying the short-range image and the long-range image separated into two parts is configured, a first reflector is configured in a square shape on the front surface of the long-range image to generate a separation distance from the short-range image, and a translucent mirror for forming a square space Z is configured in a square shape on the front surface of the short-range image.

As another method, one observing port is provided by the configuration method and a black matte surface is provided in one direction of the translucent mirror and the black matte surface is transmitted or reflected through the translucent mirror to add a shade effect to the short-range image and the long-range image and increase the clearness by 2 to 4 times.

As another method, any one of the first and second image displays or both the first and second image displays is configured by a projector and a screen to increase the brightness of the short-range image by 20 times.

As another method, in each structure, first and second observing ports are configured at both ends of the translucent mirror to view the image in both vertical directions or a second reflector is formed in a square shape at one end of the translucent mirror so that an internal angle is a right angle, and the image is observed in both left and right directions or both front and rear directions along the square direction of the second reflector.

Further, the structure of the present is configured by a vertical-shaped image box and a plurality of image boxes is installed in a moving direction of the observer to be continuously exhibited.

According to the present invention, the long-range image and the short-range image separated from one image are spaced apart from each other in the space and the short-range image located on the back side is transmitted through the dark background around the short-range image to be synthesized by one image and create a spatial 3D effect by perspective.

In addition, the square space z effect as illustrated in FIG. 2 and the perspective spatial action given by the separation distance B are combined and displayed at the same time to create the reality in the space.

The first and second observing ports are formed in the reflection direction and the transmission direction of the translucent mirror to simultaneously view the same image in both front and left directions of the vertical direction, both front and rear directions, both left and right directions, or one left or right direction.

The configuration of the black matte plate which is provided in one direction of the translucent mirror and gives a dark shadow effect increases the clearness of the image by 2 to 8 times.

Therefore, unlike the related art, in the present invention, the long-range image and the short-range image are separated from one image, spaced apart from each other along the perspective distance, and synthesized in the viewing direction in the square space z of the translucent mirror, and as a result, the function and the effect which may be viewed in both reflection and transmission directions are organically interacted to provide a spatial 3D image with high definition of 4 to 10 times or more in the glassless mode without polarizing glasses.

BRIEF DESCRIPTION OF THE DRAWINGS

The above and other aspects, features, and advantages of the present invention will now be described in detail with reference to certain exemplary embodiments thereof illustrated in the accompanying drawings which are given hereinbelow by way of illustration only, and thus are not limitative of the present invention, in which:

FIGS. 12A, 12B, and 12C are explanatory diagrams of an exhibition hall structure;

FIG. 13 is an explanatory diagram of connection with a desk structure;

FIG. 14 is an explanatory diagram of a configuration connected with an advertising device.

DETAILED DESCRIPTION OF THE INVENTION

Configurations of the present invention are as follows with reference to the illustrated drawings.

Figure 1A:
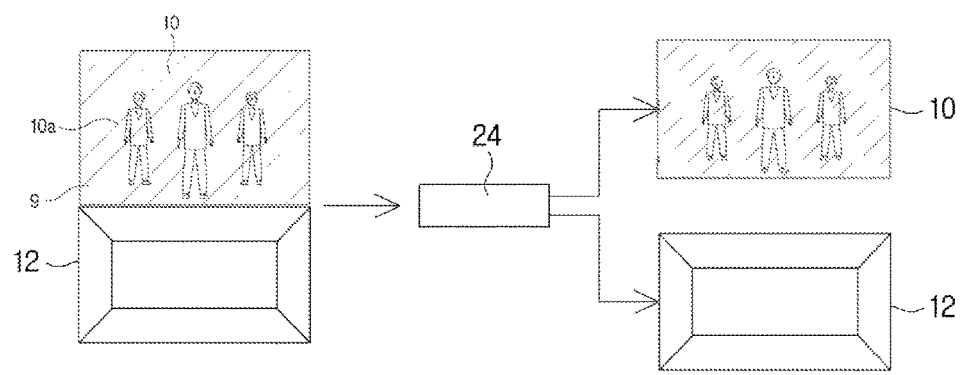
FIG. 1A is an explanatory diagram of separating one image into a short-range image, a dark background, and a long-range image.

Generally, one image has a short-range image and a long-short image as one image on a 2D screen, and as illustrated in FIG. 1A, the image are expressed on an image display or separated and input into a short-range image 10 and a long-range image 12 on first and second image displays 9a and 9b by using an image distributor 24, respectively.

For example, in a scene in which a singer sings in the stage, the singing scene of the singer as the short-range image becomes the short-range image 10 located at a short distance base on perspective and the stage scene becomes the long-range image 12 as an image located at a long distance.

The short-range image 10 and the long-range image 12 need to have a separation distance B in the space and be synthesized at the separation distance B to form the perspective.

Figure 4A:
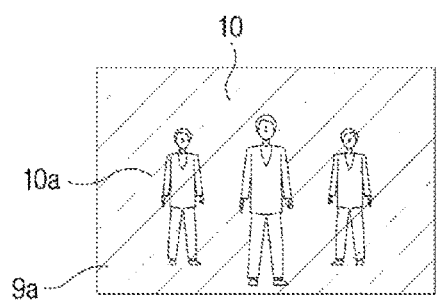
FIGS. 4A, 4B, 4C, and 4D are basic explanatory diagrams of the present invention.
Figure 4B:
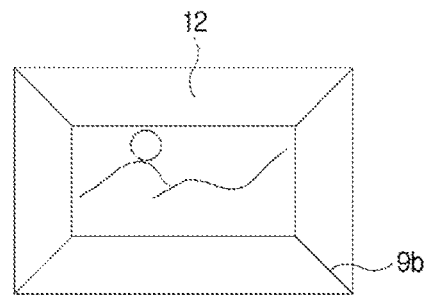
Figure 4C:
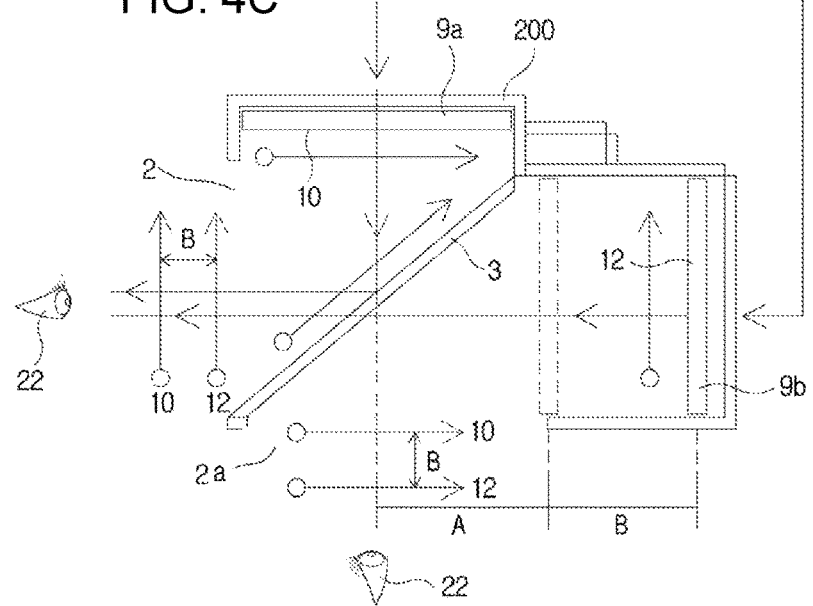
Figure 4D:
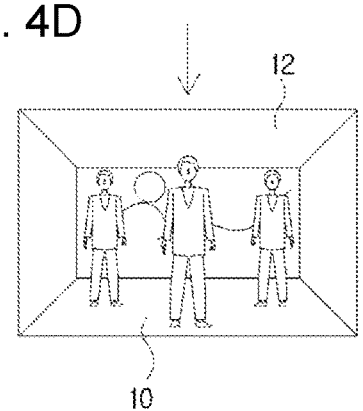

That is, as illustrated in FIGS. 2, 4C, 5A, 6B, 6C, and 7, the position of the short-range image 10 and the position of the long-range image 12 are configured so that a ratio A:B of the separation distance B of the long-range image 12 to a viewing position A of the short-range image 10 is 1:1.1 to 10 times based on an observer 22 as illustrated in FIG. 4C. That is, when the ratio of the separation distance B is 1.1 times or less, a distance separation sense is lost and the perspective of the present invention may not be obtained, and when the ratio of the separation distance B is 10 times or more, the long-range image 12 becomes too distant and unnaturally small.

Accordingly, as illustrated in FIG. 4A, the periphery of the short-range image 10 is formed with a dark background 10a and the long-range image 12 is transmitted to the dark background 10a to be synthesized.

The reason why the dark background 10a is formed is that the long-range image 12 on the back side is blocked when another image exists or a high brightness image exists around the short-range image 10.

Figure 1B:
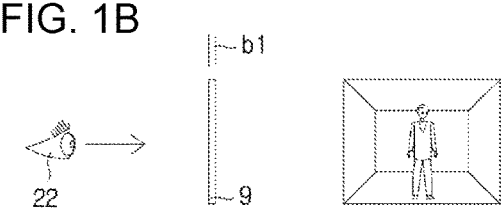
FIG. 1B is an explanatory reference diagram of a transparent LCD image plate.

As illustrated in FIG. 1B, since an imaging device such as a transmissive LCD provides an image on a plane of a vertical thin film by a thin film thickness of image pixels, only the image such as a cardboard is formed and the space reality is not formed.

Figure 2:
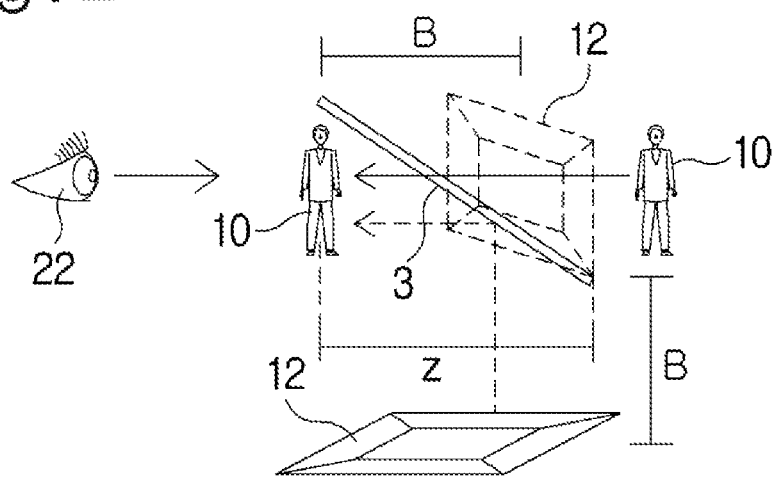
FIG. 2 is an explanatory diagram of a square space z with a translucent mirror 3 having a square shape.

Accordingly, in order to create the spatial realism, in the present invention, as illustrated in FIG. 2, a position of the long-range image 12 to the short-range image 10 is separated by the separation distance B which may feel a perspective distance.

Further, the translucent mirror 3 has a transparent structure in which a part of the short-range image 10 is transmitted and a part thereof is reflected, and a part of the long-range image 12 is transmitted and a part thereof is reflected, has a square shape in the space, and has an image effect as if the short-range image 10 and the long-range image 12 are synthesized in the space.

That is, the short-range image 10 transmitted from the back side and the long-range image 12 reflected from the lower side are synthesized in one viewing direction with a space sense equal to the separation distance B in the spatial area of the square of the translucent mirror 3 and observed while being reflected vertically, so that the viewer feels as if the separation distance B in the vertical direction becomes the separation distance B in the horizontal direction.

In more detail, as illustrated, the short-range image 10 which is directly transmitted or reflected to the translucent mirror 3 is directly transmitted or reflected to the translucent mirror 3 to the translucent mirror 3 having the square shape with an angle of 45°, and in a triangular structure, since a horizontal distance of a horizontal side, that is, a square space z is formed when the 45° square is set as an oblique side, the space reality like as a prism action is created.

That is, the long-range image 12 in which the square of the translucent mirror 3 becomes the oblique side of the triangular structure and reflected in a horizontal form at the lower side is vertically reflected from the square space z having an inclined angle of the translucent mirror 3.

Accordingly, the long-range image 12 and the short-range image 10 are mutually synthesized at the position of the translucent mirror 3 while maintaining the separation distance B therebetween.

The structure of the translucent mirrors 3 and 3a has reflection and transmission effects while the overall shape is the transparent structure by coating or depositing a transparent reflective material such as titanium oxide (TiO2), silicon oxide (SiO2), magnesium oxide (MgO) and silicon on the surface of a transparent material such as transparent glass, plastic, and a film.

Accordingly, since the mirror itself is invisible and only the image is visible, the spatial sense as if the image is floating in the air is provided.

The translucent mirror 3 adjusts the reflectance and the transmittance by adjusting the coating thickness of the transparent reflective material.

The reflectance and the transmittance are in inverse proportion to each other. That is, when the reflectance is 80%, the transmittance is 20%.

The ratio of the reflectance and the transmittance is adjusted and used at 8:2 to 2:8 based on 5:5 according to the use.

For example, when it is necessary that the short-range image 10 is brighter than the long-range image 12, the short-range image 10 is 1.5 times brighter than the long-range image 12 when the ratio of the transmittance and the reflectance is 6:4.

Figure 3A:
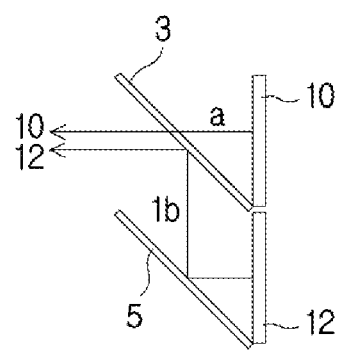
FIG. 3A is an explanatory diagram for a 2-division image.
Figure 3B:
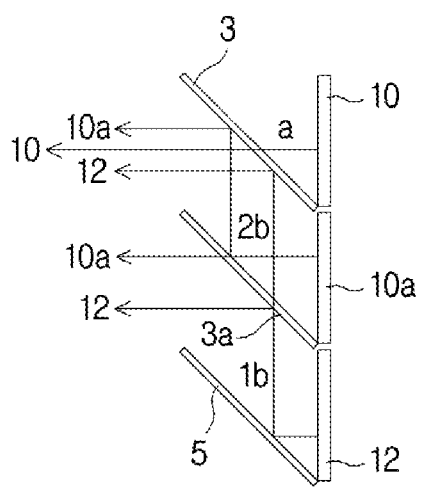
FIG. 3B is an explanatory diagram for a 3-division image.

As another method of forming the separation distance B, as illustrated in FIGS. 3A and 3B, the short-range image 10 is disposed on the upper end and the long-range image 12 is disposed on the lower end, and a first reflector 5 is formed in a square shape at the front end of the long-range image 12 and the translucent mirror 3 is formed in a square shape at the front end of the short-range image 10, and the first reflector 5 and the translucent mirror 3 are formed in parallel square shapes.

The long-range image 12 is right-reflected upward from the first reflector 5 and then right-reflected horizontally from the reflection surface of the translucent mirror 3 again, and the short-range image 10 is transmitted through the translucent mirror 3 to be combined with the long-range image 12 as one image.

In this case, the position of the long-range image 12 becomes a distance of 1b+a and the position of the short-range image 10 becomes a. That is, as illustrated in FIG. 2, in the square space z having the translucent mirror 3, since the long-range image 12 is formed in a position space separated by a distance of 1b compared to the short-range image 10, a spatial perspective is formed.

As illustrated in FIG. 3B, when the image is separated into the short-range image 10, an intermediate short-range image 11, and the long-range image 12, for example, the first reflector 5 is provided at the front end of the long-range image 12, and the translucent mirrors 3 are arranged in the parallel square at the front ends of the intermediate short-range image 11 and the short-range image 10.

The long-range image 12 is upward-reflected vertically by the first reflector 5, transmitted through the first translucent mirror 3a, and right-reflected at the translucent mirror 3. A part of the intermediate short-range image 11 is transmitted and a part thereof is reflected, and the intermediate short-range image 11 is right-reflected upwardly and then right-reflected at the translucent mirror 3. In addition, the short-range image 10 is right-reflected at the translucent mirror 3 again.

As such, in the present invention, the rest parts except the first reflector 5 formed at the front end of the long-range image 12 at the lowest portion are constituted by the translucent mirrors 3 and 3a, and the rest images except for the long-range image 12 are synthesized to one image having the space realty because that the periphery needs to be formed as the dark background 10a.

That is, based on the position of the translucent mirror, the position of the long-range image 12 becomes 1b+2b+a, the position of the intermediate short-range image 11 becomes a+2b, and the position of the short-range image 10 becomes a.

That is, since each of the images having different space positions and spaced apart from each other by the separation distance B is synthesized in the space formed by the square of the translucent mirror 3, the space reality may be felt.

As the configuration of the image displays 9a, 9b, and 9 applied to the present invention, all of other known image displays such as an LCD, an LED, a QLED, a micro LED, a flat display, a curved display, a projector and a screen, a glassless stereoscopic display attached with a lenticular surface image, a transparent LCD, a tablet image display and the like may be applied.

As illustrated in FIGS. 4, 5, 6, 7, 10B and 10C, in the present invention, the short-range image 10 and the long-range image 12 are input and created on two image displays 9a and 9b, respectively, and the screen is provided with an image of 16:9.

However, the screen ratio in the present invention is not limited to 16:9. Various screen ratios including 4:3, 18:9 16:10, and 2.35:1 are applied.

Figure 8A:
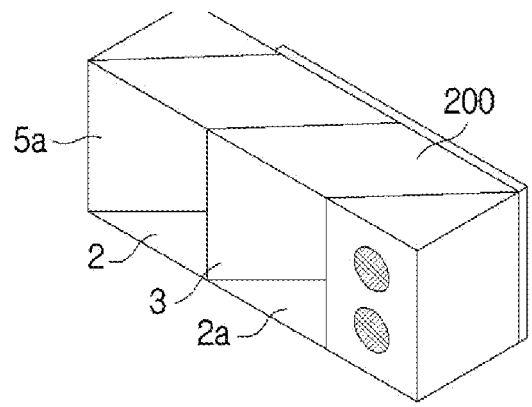
FIGS. 8A, 8B, and 8C are explanatory diagrams of one image display and a left and right multiple image structure.
Figure 8B:
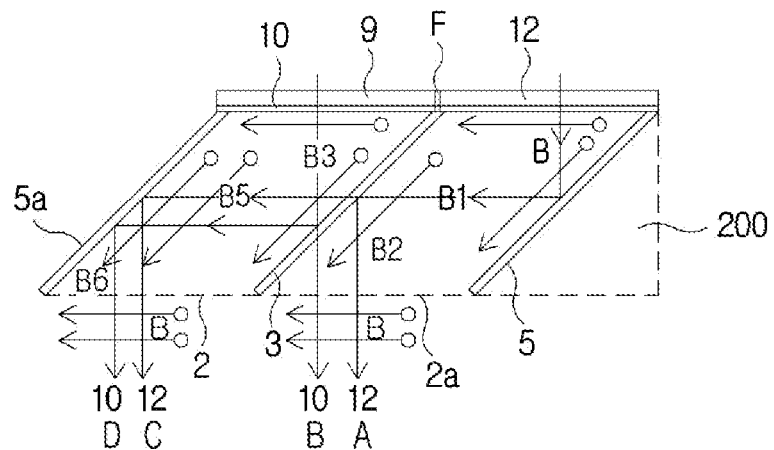
Figure 8C:
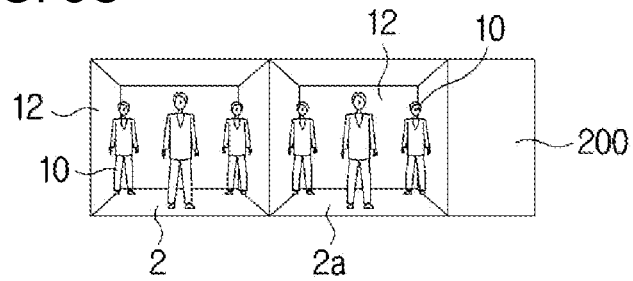
Figure 9:
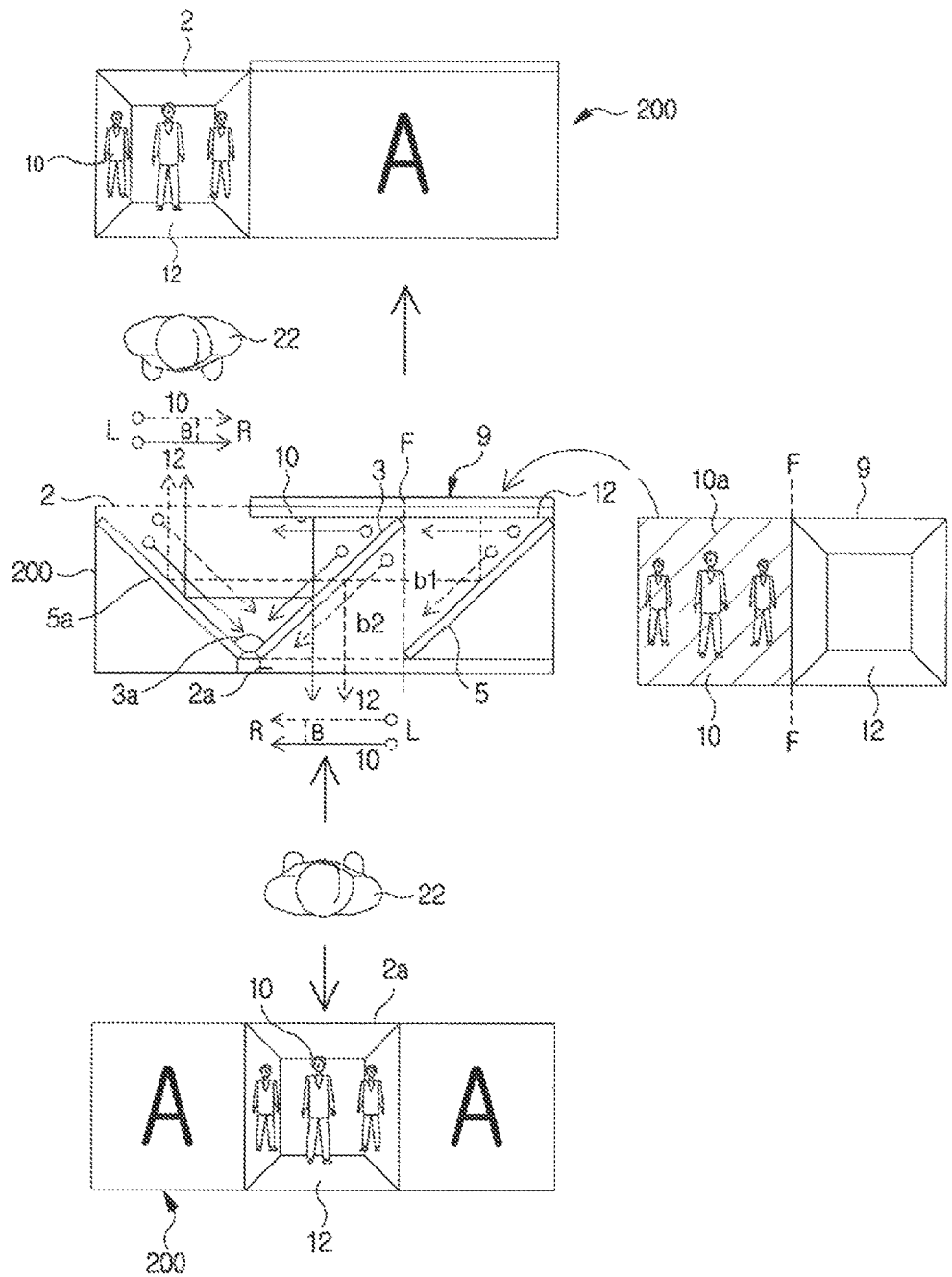
FIG. 9 is an explanatory diagram of one image display and a front and rear two-way viewing structure.
Figures 10A, 10B, 10C, 10D:
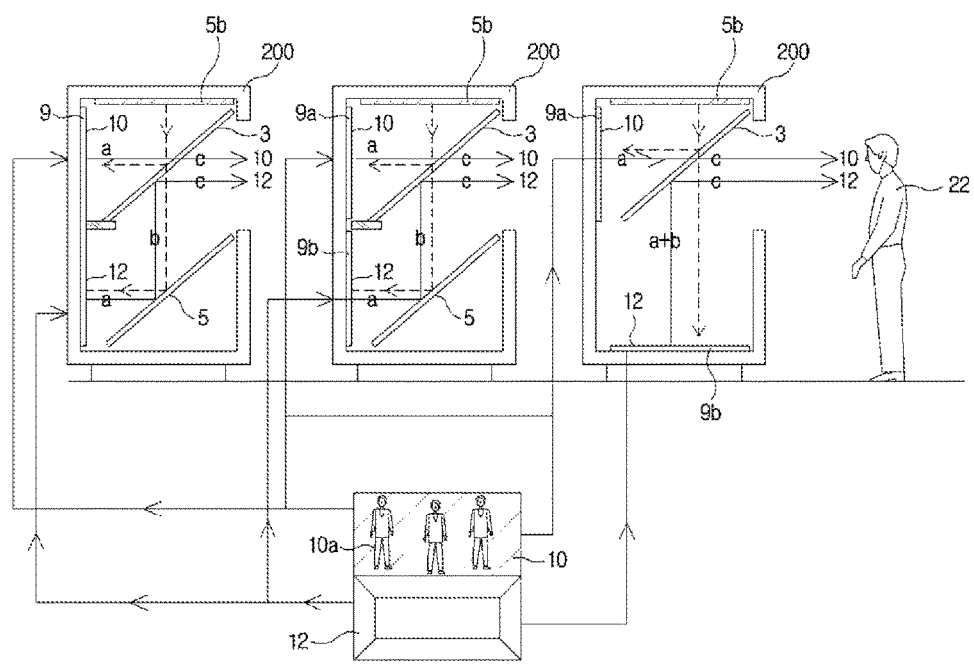
FIGS. 10A, 10B, 10C, and 10D are explanatory diagrams of an exhibition image form structure.

As illustrated in FIGS. 8, 9, and 10A, in the present invention, the screen of one image display 9 is separated into two to input and create the short-range image 10 and the long-range image 12 and the screen is provided with an image of 8:9.

However, the screen ratio is not limited to 8:9. Various screen ratios including 16:4.5, 4:1.5, and 2:3 are applied.

As such, the present invention is characterized that all of the embodiments of the present invention described with reference to the following drawings have the above-described effects.

This will be described in more detail as follows with reference to the following drawings.

As illustrated in FIG. 4C, a first image display 9a is provided at the rear end in an image box 200 and a second image display 9b is provided to have a perpendicular structure compared with the first image display 9a, and the second image display 9b is provided at a position separated by the image separation distance B.

The short-range image 10 is input to the first image display 9a as illustrated in FIG. 4A and the long-range image 12 is input to the second image display 9b as illustrated in FIG. 4B. As illustrated in FIG. 4A, the periphery of the short-range image 10 is treated as the dark background 10a.

As illustrated in FIG. 4C, the first reflector 3 is provided at a position spaced apart from the front surface of the first image display 9a by a separation distance and has a square, a second observing port 2a is provided on the front surface of the first reflector 3, and a first observing port 2 is provided at a position perpendicular to the first image display 9a, that is, the front direction of the first image display 9a.

That is, since the first observing port 2 is configured in a leftward direction and the second observing port 2a is configured in a front direction, that is, a frontward direction, that is, the observing ports are configured with a perpendicular structure in both left and front directions, the image may be observed in both left and front directions.

In the structure of the present invention, a part of the amount of light of the short-range image 10 is straightly transmitted through the translucent mirror 3 to be exposed to the second observing port 2a, and the rest of the amount of light of the short-range image 10 is orthogonally reflected to the translucent mirror 3, and as a result, the image is inverted from the left and right sides to the right and left sides and then displayed to the first observing port 2.

At this time, since the left and right sides of the image on the second image display 9b do not coincide with each other as compared to the first image display 9a in the translucent mirror, either the first image display 9a or the second image display 9b is configured so that the left and right directions are inverted to the right and left directions.

A part of the long-range image 12 on the second image display 9b is inverted from the right and left sides to the left and right sides while being right-reflected on the translucent mirror 3 to be displayed on the second observing port 2a, and the rest of the amount of light of the long-range image 12 is right-transmitted through the translucent mirror 3 and then displayed on the first observing port 2.

The image on the first image display 9a is transmitted and reflected on the translucent mirror 3 with the same logic.

Accordingly, the synthesized image of the short-range image 10 and the long-range image 12 is observed through the first and second observing ports 2 and 2a formed on the perpendicular direction to the front surface, that is, the left surface is simultaneously observed as the same image at the left and right sides.

The structure needs to form only one observing port of the first and second observing ports 2 and 2a if necessary.

Figure 5A:
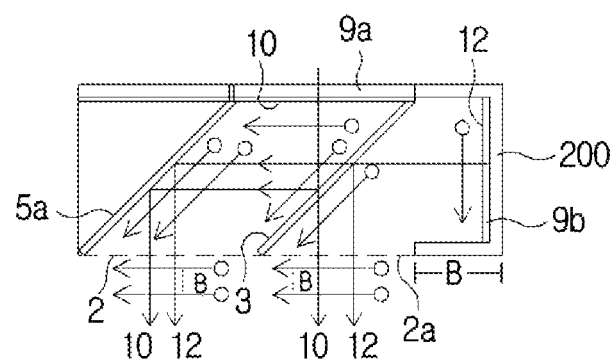
FIGS. 5A and 5B are explanatory diagrams of left and right multiple image structures.
Figure 5B:
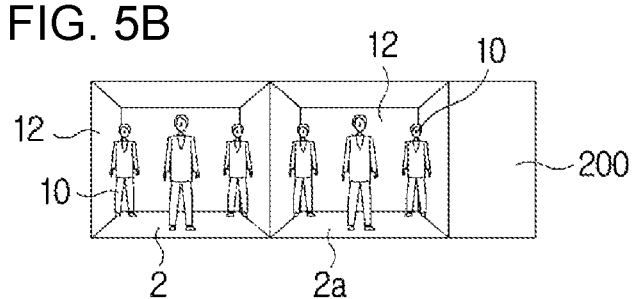

In the configuration in FIG. 5A, the second and first reflectors 5a are additionally provided at the end of the first image display 9a in the structure of FIG. 4, but are configured to be parallel to each other at the same angle as the translucent mirror 3, and as illustrated in FIG. 5B, the first observing port 2 and the second observing port 2a are configured in left and right parallel structures.

That is, a part of the amount of light of the long-range image 12 is transmitted straightly through the translucent mirror 3 and then right-reflected on the second reflector 5a to be displayed on the first observing port 2.

The rest of the amount of light of the long-range image 12 is right-reflected on the translucent mirror 3 to be displayed on the second observing port 2a.

A part of the amount of light of the short-range image 10 is transmitted straightly through the translucent mirror 3 and then right-reflected on the second reflector 5a to be displayed on the first observing port 2.

The rest of the amount of light of the short-range image 10 is right-reflected on the translucent mirror 3 to be displayed on the second observing port 2a.

The operation, the configuration, and the functional principle are the same logic as illustrated in FIG. 4C, but there is a difference that one image may be viewed in two multiple images.

Figure 6A:
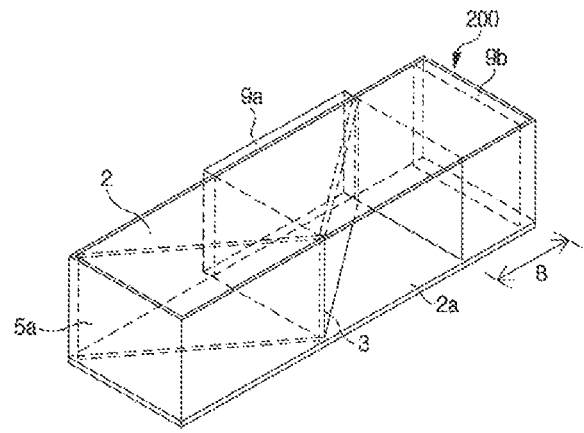
FIGS. 6A and 6B are explanatory diagrams of a front and rear two-way viewing structure.
Figure 6B:
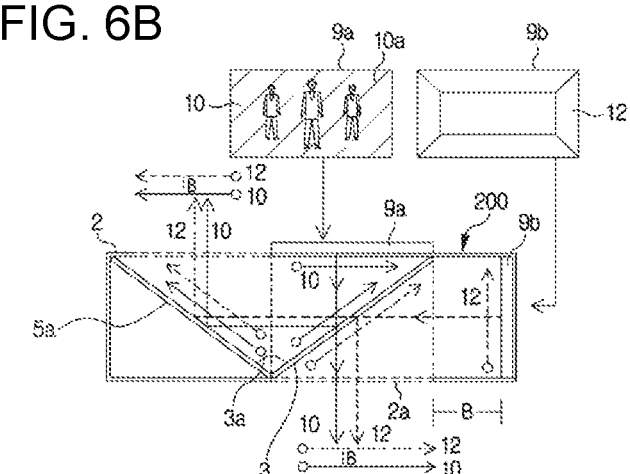

In the structure of FIGS. 6A and 6B, the structure of the second reflector 5a in the structure of FIG. 5A is configured so that an internal angle forms a right angle with the opposite direction, that is, the front end of the translucent mirror 3. Accordingly, the viewing directions of the first observing port 2 and the second observing port 2a may be viewed in opposite directions, that is, both forward and backward.

The operation, the configuration, and the functional principle are as illustrated in FIG. 5A.

Such a configuration has an effect that one image may be viewed in both front and rear directions.

Figure 6C:
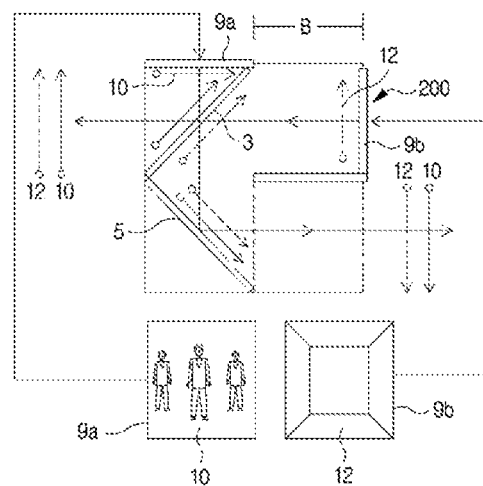
FIG. 6C is an explanatory diagram of a left and right two-way viewing structure.

The structure of FIG. 6C is configured to be observed in both left and right directions by configuring only the reflective direction of the structure of the second reflector 5a in an opposite direction in the structure of FIGS. 6A and 6(b).

Figure 7:
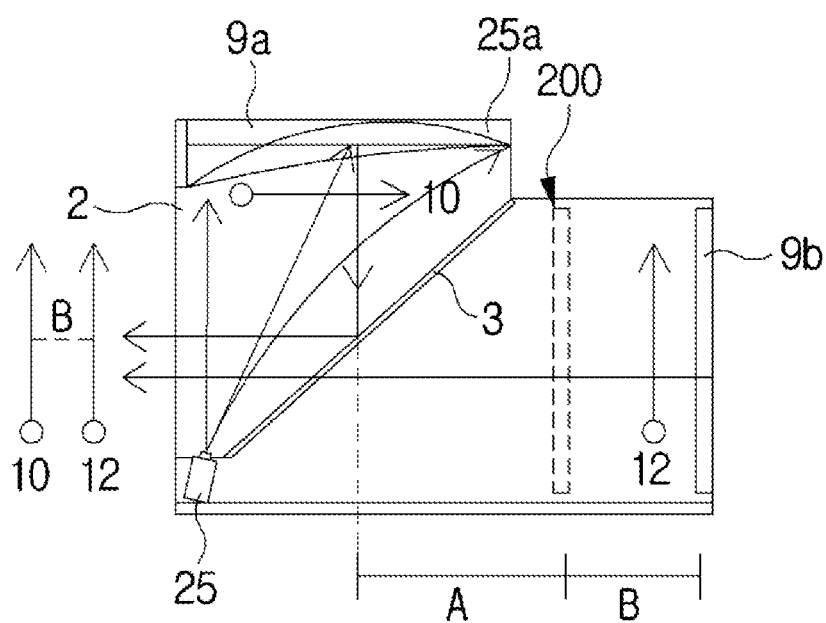
FIG. 7 is a configuration explanatory diagram of a projector and a projection screen.

FIG. 7 has the same principle as the structure of FIG. 4C, but is has a feature that either the first image display 9a or the second image display 9b or both the first image display 9a and the second image display 9b are constituted by a projector 25 and a screen 25a.

The structure of the projector 25 and the screen 25a is advantageous to be light in weight and easily made larger when the image is made larger in size.

Also, in the present invention described above, the short-range image 10 is very bright compared to the long-range image 12, and thus the spatial 3D effect is increased.

At least the brightness of the short-range image 10 needs to be 2 times larger than the brightness of the long-range image 12, and the definition effect is very good when the brightness is about 10 times larger.

Therefore, when the image projected on the screen 25a is small, it is advantageous to provide a bright image compared to the conventional image display, and in the case of adopting, for example, a 20-gain high-reflection screen as the high-brightness screen, an image 20 times brighter than a general screen image may be provided.

Such a configuration may easily implement a large image on a screen and form a high-brightness image with higher brightness than a general image display, and the configuration may be applied to all embodiments of the present invention.

In the present invention, left and right directions of one of the images on the first and second image displays 9a an 9b need to be changed to the right and left directions.

When describing FIG. 4C as an example, the reason is that a part of the short-range image 10 is right-reflected on the translucent mirror 3 to be reflected to the first observing port 2 and a part of the long-range image 12 is straightly transmitted to the first observing port 2 on the translucent mirror 3 and the left and right directions of the image are changed to the right and left directions while the short-range image 10 is right-reflected.

Further, a part of the short-range image 10 is straightly transmitted through the translucent mirror 3 and the long-range image 12 is right-reflected from the translucent mirror 3 to the second observing mirror 2a, and the left and right directions of the long-range image 12 are changed to the right and left directions during right-reflection.

Accordingly, for the above reason, in FIGS. 4, 5, 6, 7, 10B, and 10C, in the case of the embodiment of the present invention using two image displays such as the first image display 9a or the second image display 9b, the direction of one image needs to be inverted from the left and right sides to the right and left sides.

As illustrated in FIGS. 8A, 8B, and 8C, in the present invention, the center of the image of one image display 9 is separated into left and right sides to display the short-range image 10 and the long-range image 12 and has the first reflector 5 on the front surface of the long-range image 12 and the translucent mirror 3 on the front surface of the short-range image 10. The first reflector 5 and the translucent mirror 3 are arranged in parallel in the same square direction and both or one of the first and second observing ports 2 and 2a are selectively provided at the front end thereof.

In the present invention, a part of the amount of light of the short-range image 10 displayed on one side of the image display 9 is transmitted straightly through the translucent mirror 3 to be displayed to the second observing port 2a, and the rest of the amount of light of the short-range image 10 is right-reflected on the translucent mirror 3 and then right-reflected on the second mirror 5a again to be displayed on the first observing port 2.

A part of the amount of light of the long-range image 12 displayed on the other side of the image display 9 is right-reflected on the first reflector 5, straightly transmitted through the translucent mirror 3, and then right-reflected on the second reflector 5a to be displayed on the first observing port 2, and the rest of the amount of light of the long-range image 12 is right-reflected on the translucent mirror 3 to be displayed on the second observing port 2a.

At this time, the long-range image 12 and the short-range image 10 may be observed with a multi-effect because the left and right directions coincide with each other even if the left and right sides are not inverted.

In this process, the long-range image 12 is separated by the reflection distance of the first reflector 5, that is, B, so that a sense of space reality is generated.

The configuration of FIG. 9 is a structure in which only the reflection direction of the second reflector 5a in the configuration of FIG. 8 is reversed and the image may be viewed in both front and rear directions.

That is, the configuration of FIG. 9 is different from that of FIG. 8 in that the configuration is provided at the end of the translucent mirror 3 so that the internal angle 3a is formed at a right angle, and the first observing port 2 is formed at the front end thereof.

In the configuration of FIG. 9, a part of the amount of light of the short-range image 10 displayed on one side of the image display 9 is transmitted straightly through the translucent mirror 3 to be displayed to the second observing port 2a, and the rest of the amount of light of the short-range image 10 is right-reflected on the translucent mirror 3 and then right-reflected on the second mirror 2a in the rear direction again to be displayed on the first observing port 2.

A part of the amount of light of the long-range image 12 displayed on the other side of the image display 9 is right-reflected on the first reflector 5, straightly transmitted through the translucent mirror 3, and then right-reflected on the second reflector 5a in the rear direction to be displayed on the first observing port 2, and the rest of the amount of light of the long-range image 12 is right-reflected on the first reflector 5 and reflected on the translucent mirror 3 to be displayed on the second observing port 2a.

At this time, the long-range image 12 and the short-range image 10 may be observed as a spatial 3D image in which the left and right directions coincide with each other even if the left and right sides are not inverted.

In this process, the long-range image 12 is separated by the reflection distance of the first reflector 5, that is, B, so that the spatial 3D effect is generated.

As illustrated in FIG. 10A, the image display 9 is formed in a vertical shape at the rear end inside the image box 200 and the image is separated into two parts as upper and lower parts and then the long-range image 12 is displayed at the lower portion and the short-range image 10 is displayed at the upper portion. The first reflector 5 has a square shape to be reflected upward on the front surface of the long-range image 12 and the translucent mirror 3 is configured in parallel in the same square direction as the first reflector 5 on the front surface of the upper short-range image 10.

A black matt surface 5b is provided on the upper surface of the translucent mirror 3.

In such a configuration, the short-range image 10 displayed on the upper end of the image display 9 is transmitted through the translucent mirror 3 to be provided to the viewer 22, and the long-range image 12 displayed on the lower end of the image display 9 is right-reflected upward on the first reflector 5 and then right-reflected on the translucent mirror 3 to be provided to the viewer 22 in a manner of overlapping with the short-range image 10.

At this time, the reflection length of the long-range image 12 becomes a+b+c, and the transmission length of the short-range image 10 becomes a+c. That is, the position of the long-range image 12 is spaced apart from the dark background 10a around the short-range image 10 by the distance B and the long-range image 12 and the short-range image 10 are separated from each other to provide a floating spatial 3D effect.

As illustrated in FIG. 10B, in the image box 200, the first image display 9a is provided on the upper end and the second image display 9b is provided on the lower end to display the short-range image 10 on the first image display 9a and the long-range image 12 on the second image display 9b, respectively.

The first reflector 5 is disposed at the front end of the long-range image 12 in a square shape to be right-reflected upwardly, and the translucent mirror 3 is formed on the front end of the short-range image 10 in parallel in a square shape in the same direction as the lower first reflector 5, and the black matte surface 5b is provided on the upper surface of the translucent mirror 3.

In such a configuration, the short-range image 10 displayed on the upper end of the image display 9 is transmitted through the translucent mirror 3 to be provided to the viewer 22, and the long-range image 12 displayed on the lower end of the image display 9 is right-reflected upward on the first reflector 5 and then right-reflected on the translucent mirror 3 to be provided to the viewer 22 in a manner of overlapping with the short-range image 10.

At this time, the reflection length of the long-range image 12 becomes a+b+c, and the transmission length of the short-range image 10 becomes a+c. That is, the position of the long-range image 12 is spaced apart from the dark background 10a around the short-range image 10 by the distance b and the long-range image 12 and the short-range image 10 are separated from each other to provide a floating spatial 3D effect.

As illustrated in FIG. 10C, the first image display 9a and the second image display 9b are configured as upper and lower ends at the rear end in the image box 200, and the second image display 9b is configured on the bottom to be spaced apart by a+b, and the structure of the first reflector is not removed, and the image on the second image display 9b is configured by inverting the left and right directions to the right and left directions.

As illustrated in FIGS. 10A, 10B, and 10C, the black matte surface 5b is provided on the upper surface of the image box 200, and the first image display 9a is provided at the rear end based on the front surface of the image box 200, and the second image display 9b is provided on the bottom surface of the image box 200.

The short-range image 10 of the first image display 9a straightly transmits the translucent mirror 3 to the viewer 22 with the reflection distance of a+c and the long-range image 12 of the second image display 9b is reflected on the translucent mirror 3 by the distance of a+b and reflected to the viewer 22 by the distance of c, that is, the distance of a+b+c.

That is, the image on the first image display 9a, which is the short-range image 10, is viewed to be closer than the image of the second image display 9b by the distance b, thereby providing a floating spatial 3D effect.

In the present invention, like the structure illustrated in FIGS. 10A, 10B, and 10C, the black matte surface 5b is formed on one surface of the translucent mirror 3.

In particular, since an exhibition observing device is installed at a bright place, the image needs to be clear. However, as illustrated in FIGS. 10A, 10B, and 10C, external light is transmitted through the translucent mirror 3 to be irradiated on the surface of the short-range image 10, thereby deteriorating the contrast of the short-range image 10. In addition, the external light is reflected on the translucent mirror 3 and reflected on the first reflector 5 at the bottom and irradiated to the long-range image 12, thereby deteriorating the contrast of the long-range image 12 and reduce the clearness.

The effect of the black matte surface 5b has a so-called known black screen effect, and as illustrate in FIG. 10C, the light is irradiated on the surface of the short-range image 10 in the translucent mirror 3 and transmitted through the translucent mirror 3 to offset the external light, and thus, the clearness is increased by 2 to 4 times.

Further, the black effect that the image is transmitted through the translucent mirror 3 and reflected to the long-range image 12 in the lower first reflector 5 offsets the external light irradiated from the outside through the reflective surface 5 of the translucent mirror 3, thereby exhibiting the clearness effect of 2 to 4 times or more.

Figure 11:
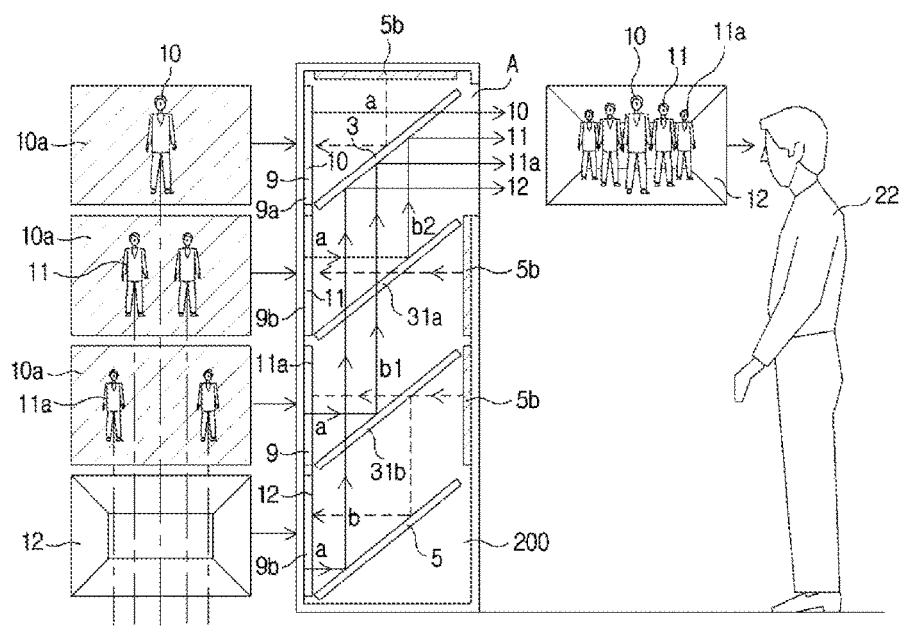
FIG. 11 is an explanatory diagram of a configuration of a multiple image having a vertical structure.

As illustrated in FIG. 11, in the present invention, it is important that the short-range image 10 or the long-range image 12 is separated into the back screen 11 and separated into the long-range image 12 again to be provided in one frame in which the separated screens are simultaneously moved.

Accordingly, in the present invention, one image is separated into the short-range image 10, the back screen 11 and the long-range image 12 to be configured as one frame, respectively, and provided to one or a plurality of image displays.

That is, the present invention may create spatial reality images in multiple layers. The first image display 9a and the second image display 9b are vertically configured as two upper and lower stages, and the images are separated into upper and lower images. Thus, the long-range image 12 is input to the lowest end, the first short-range image 10a is input to the upper end thereof, the second short-range image 11 is input to the upper end thereof, and the short-range image 10 is input to the upper end thereof, respectively.

In this configuration, the long-range image 12 at the lowermost end is upwardly reflected on the first reflector 5, sequentially transmitted through the first translucent mirror 31a and the second translucent mirror 31b, and then refracted and reflected to the viewer 22 on the surface of the translucent mirror 3 at the upper end.

The second short-range image 11a is upwardly reflected on the first translucent mirror 31b at the front surface and refracted and reflected to the position of the viewer 22 on the surface of the translucent mirror 3.

The short-range image 10 is straightly transmitted through the translucent mirror 3 to be transmitted to the position of the viewer 22.

Accordingly, as illustrated in FIG. 11, the viewer 22 may view the long-range image 12 at the position of a+b+b1+b2+a compared to the short-range image 10, the short-range image 11a at the position of b1+b2+a, and the first short-range image 11 at the position of b2+a.

The structure of the first reflector used in the present invention is configured by the first reflector 5 and the second reflector 5a. However, in the present invention, the thickness of the first reflector or the glass surface of the surface with the reflective surface is formed as a thin film.

Also, the second reflector 5a has the function and effect of simultaneously providing the synthesized short-range image 10 and long-range image 12 in both front an rear directions, both left and right directions, or one left or right direction according to the reflection direction.

In the present invention, as illustrated in FIG. 12A or 12B, the image box 200 is configured in the left and right horizontal directions, and as illustrated in FIG. 12C, several to several hundreds of exhibition sites 201 are installed and a spectator (not illustrated) is configured to enjoy the image while moving along the moving line.

As illustrated in FIG. 13, in the present invention, a desk 29 is connected to the structure of FIGS. 10A, 10B, and 10C. Such a configuration may obtain an augmented reality image effect when used for educational purposes.

That is, when the contents of the textbook are represented in the long-range image 12 and a part of the long-range image 12 is designated by adjusting with an image controller such as a mouse, an auxiliary image of the corresponding image may be provided as the short-range image 10.

For example, when several kinds of dinosaurs appear in the contents of the textbook as the long-range image 12 and one of the dinosaurs is designated by a mouse, the moving appearance of the corresponding dinosaur is particularly provided in the short-range image 10, thereby enhancing an education effect.

Further, the present invention may also be used as cartoon, animation, or image structures to feel the sense of space reality.

For example, when the long-range image 12 is expressed as a background of the cartoon and the short-range image 10 is expressed as a subject image, a space-realistic cartoon feeling a sense of spatial reality can be provided.

Further, the present invention may also be applied to game devices. The short-range image 10 may be a main game operation image and the long-range image 12 may be a background or stage image.

However, in any case, the periphery of the short-range image 10 needs to be treated as a dark background 10a, and the short-range image 10 and the long-range image 12 need to form a separation space by creating a separation distance B.

As illustrated in FIG. 14, the present invention may be configured by combining the structure of an advertising device 28 capable of inserting advertisements to the front bottom of a case 1 and may be applied to the structure of FIGS. 10A, 10B, and 10C.

The structure of an advertisement board A may be constituted by an advertisement frame structure having an open/close structure that easily inserts and removes a poster, and an illuminating plate may be formed on the back of the advertisement board A and a film may be mounted on the surface.

In the present invention having the structure of the advertisement board A, the advertisement effect may be doubled by simultaneously providing a moving image with space reality at the top and an image such as a poster at the bottom.

Figure 15A:
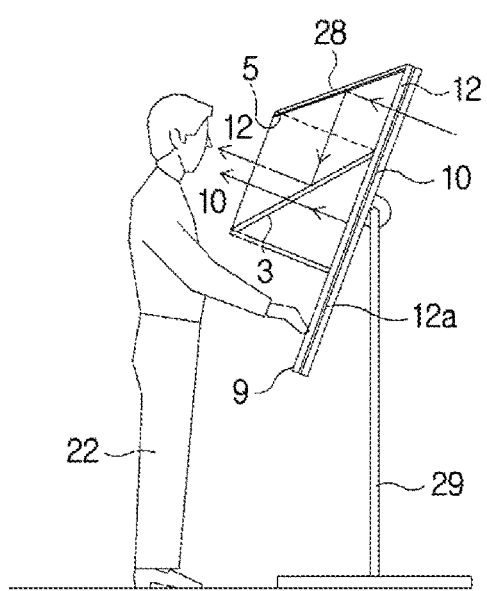
FIGS. 15A and 15B are explanatory diagrams of a movable guide plate structure.
Figure 15B:
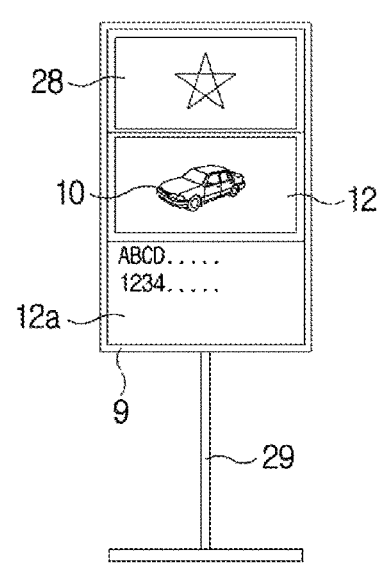

As such, in the present invention, as illustrated in FIGS. 15A and 15B, one image display 9 is divided into three parts in upper and lower or left and right directions, or configured by two displays 9a and 9b or three displays 9, 9a, and 9b, and three screens are configured in upper and lower or left and right directions, the long-range image 12 is provided on the upper screen, and the short-range image 10 is provide on a middle screen, a structure provided with texts, drawings, and a supplementary advertisement text is configured at the lower end and configured to be coupled with a supporter 29 to be moved to a required position.

In this case, as illustrated in FIG. 15A, the first reflector 5 is formed in a square based on 45 degrees at the front end of the long-range image 12, and the translucent mirror 3 is formed in a square in the same direction as the first reflector 5 in the short-range image 10.

In this case, the short-range image 10 is transmitted through the translucent mirror 3 and the long-range image 12 is reflected on the first reflector 5 and then transmitted through the dark background 10a around the short-range image 10 to be combined into one image.

The viewer 22 may observe the long-range image 12 positioned at the image separation distance B spaced apart by the reflection length of the first reflector 5 and the long-range image 12 such as a car with the increased spatial 3D effect due to the action of the square space Z at the same time, so that the short-range image 10 has the perspective as the background of the long-range image 12.

Accordingly, in the embodiment of the present invention described above, while the viewer 22 views the car image having the spatial perspective, the viewer may view various specifications, features, prices, and characters provided by the lower image and control the image by a touch type, thereby doubling exhibition an promotion effects.

In addition, in the embodiment of the present invention, the logo of the company or the real product such as a smart phone is provided on an outer surface 28 of the surface position of the upper first reflector 5 at the same time, thereby increasing a promotion effect.

The present invention may be configured by changing the positions of the screens configured in the upper, middle, lower, or left and right directions, that is, the positions of the long-range image 12, the short-range image 10, and the respective character auxiliary images 12a, respectively.

Even in the case, the dark background 100 needs to be formed around the short-range image 10.

Further, the configuration of the image display 9 has a configuration in which the short-range image 10 and the long-range image 12 are configured as one image, and a third image display which derives the auxiliary image 12a for displaying the lower characters may be configured by a touch type image display.

In such a configuration, there are three screens, but three screens may be divided and configured on one image display or three screens may be divided and configured on two image displays, or three screens may be configured on three image displays.

However, even in any case, the first reflector 5 is formed in a square based on 45 degrees at the front end of the long-range image 12, and the translucent mirror 3 is formed in a square in the same direction as the first reflector 5 in the short-range image 10.

The structure of the auxiliary image 12a may be applied to all configurations of the embodiment of the present invention.

In addition, in the present invention, the short-range image 10 and the long-range image 12 are fabricated as a virtual reality image at a viewing angle of 90° to 360° to rotate a viewing angle with an image control device such as a mouse, or display the image in the corresponding direction according to the rotating direction of the image display by connecting a gyro sensor, a positioning sensor, and the like to the image display, so that the images may be used as a spatially separated image for a virtual reality.

Therefore, in the present invention, the short-range image 10 and the long-range image 12 separated from one image, the short-range image 10 with a dark background, and a ratio of a viewing distance A of the short-range image 10 and a separation distance B of the long-range image 12 of at least 1:1.1 to at most 1:10 are configured, and the translucent mirror 3 is made of a transparent material and has a square shape to exhibit a square space Z effect and the separation effect by the separation distance B between the short-range image and the long-range image in the space and various functions of the constituent elements organically act at the same time to generate a spatial 3D effect by natural perspective. As a result, by the glassless viewing method without the polarizer and the polarizing glasses, the 3D effect having the clear perspective distance may be viewed by a definition image 4 to 10 times higher than the related art and the black matte surface 5b provided on one side of the translucent mirror 3 causes an effect of giving a shadow to the short-range image 10 and the long-range image 12 to increase brightness and clearness by 2 to 4 times.

Accordingly, the present invention provides an image with a clear perspective in terms of spatial realism and a high-definition image 8 to 40 times higher than that of a conventional polarizing plate.

In addition, such an image structure can be viewed by a multiple image in both front and rear directions, both left an right directions, both perpendicular directions to the front and left directions, or one direction.

Therefore, the present invention can be variously used for various purposes such as an advertisement device, a video device, a game device, a training image device, an exhibition device, and the like.

Although the exemplary embodiments of the present invention have been described with reference to the accompanying drawings as described above, those skilled in the art will be able to understand that the present invention can be implemented in other detailed forms without changing the technical spirit or an essential characteristic. Therefore, it should be appreciated that the exemplary embodiments described above are exemplificative in all aspects and not limitative.

What is claimed is:

1. An apparatus for spatially separated images, wherein one image input by the apparatus for spatially separated images is separated into a short-range image and a long-range image, respectively,
the periphery of the short-range image is configured to a low-contrast dark background so that the long-range image may be transmitted through the back side of the short-range image,
first and second image displays displaying the short-range image and the long-range image are provided, respectively,
a position of the second image display forms an image separation distance from the first image display so that the short-range image and the long-range image create a reality effect by perspective in square spaces,
a translucent mirror having a square transparent structure is constituted on the front surface of the short-range image, and
functions of the short-range image formed with the dark background, the long-range image, the separation distance, the square spaces, and the translucent mirror having the transparent structure organically act at the same time to implement a spatial 3D effect by perspective.

2. The apparatus for spatially separated images of claim 1, wherein a black matte surface is provided in one direction of the translucent mirror and transmitted or reflected through the translucent mirror to add a shade effect to the short-range image and the long-range image and increase the clearness by 2 to 4 times.

3. The apparatus for spatially separated images of claim 1, wherein any one of the first and second image displays or the structure of the first and second image displays is configured by a projector and a screen.

4. The apparatus for spatially separated images of claim 1, wherein first and second observing ports are configured at both ends of the translucent surface and reflective surface to view the image in both directions.

5. The apparatus for spatially separated images of claim 1, wherein a second reflector is formed in a square shape at one end of the translucent mirror so that an internal angle is a right angle and the image is observed in both left and right directions or both front and rear directions along the square direction of the second reflector.

6. An apparatus for spatially separated images, wherein one image input by the apparatus for spatially separated images is separated into a short-range image and a long-range image, respectively,
the periphery of the short-range image is configured to a low-contrast dark background so that the long-range image may be transmitted through the back side of the short-range image,
one image display displaying the short-range image and the long-range image separated into two parts is configured,
a first reflector is configured in a square shape on the front surface of the long-range image to generate a separation distance from the short-range image,
a translucent mirror having a transparent structure by a square space is configured on the front surface of the short-range image, and
functions of the short-range image formed with the dark background, the long-range image, the separation distance, the square spaces, and the translucent mirror having the transparent structure organically act at the same time to implement a spatial 3D effect by perspective.

7. The apparatus for spatially separated images of claim 6, wherein first and second observing ports are configured at one end of the translucent mirror to view the image in both directions.

8. The apparatus for spatially separated images of claim 6, wherein a second reflector is formed in a square shape at one end of the translucent mirror so that an internal angle is a right angle and the image is observed in both left and right directions or both front and rear directions along the square direction of the second reflector.

9. The apparatus for spatially separated images of claim 6, wherein a black matte surface is provided in one direction of the translucent mirror and transmitted or reflected through the translucent mirror to add a shade effect to the short-range image and the long-range image and increase the clearness by 2 to 4 times.

* * * * *